No. 846,187. PATENTED MAR. 5, 1907.
C. B. DAVIS.
APPARATUS FOR USE IN BREWING.
APPLICATION FILED NOV. 15, 1905.
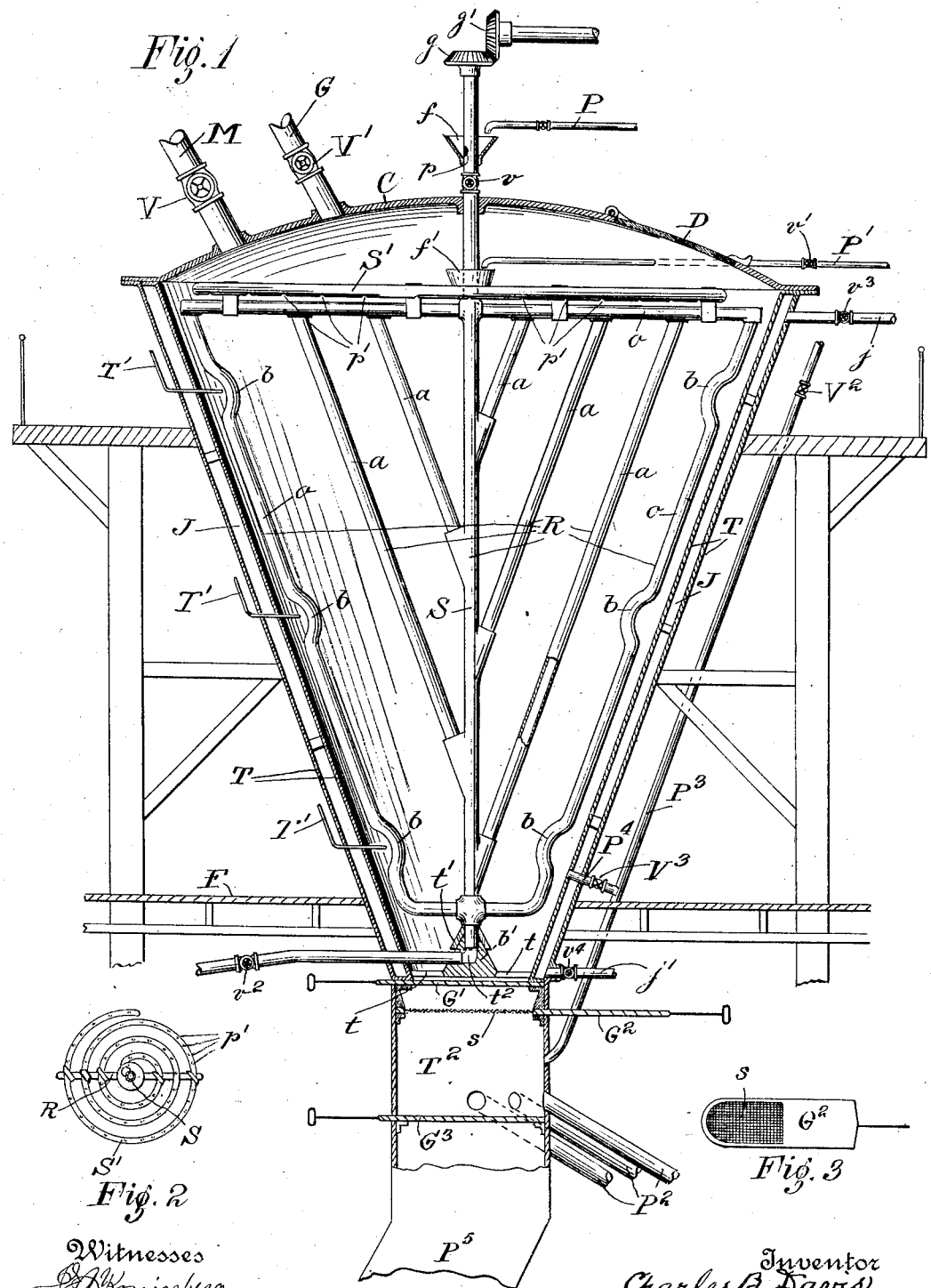
Witnesses
Inventor
Charles B. Davis
By his Attorney

UNITED STATES PATENT OFFICE.

CHARLES B. DAVIS, OF NEW YORK, N. Y.

APPARATUS FOR USE IN BREWING.

No. 846,187.     Specification of Letters Patent.     Patented March 5, 1907.

Application filed November 15, 1905. Serial No. 287,384.

*To all whom it may concern:*

Be it known that I, CHARLES BENSON DAVIS, a citizen of the United States of America, residing at the borough of Manhattan, in the city, county, and State of New York, have invented certain new and useful Improvements in Apparatus for Use in Brewing, of which the following is a specification, reference being had to the accompanying drawings, forming part of the same.

Figure 1 is a central vertical sectional view of a tun embodying my invention, but showing the greater part of the interior mechanism in full lines, though some parts are also in section to more clearly exhibit the details. Fig. 2 is a plan view, on a reduced scale, of the sparger. Fig. 3 is a detail view of the second or strainer gate hereinafter described.

My invention relates to apparatus for use in brewing, and particularly to what is called a "mash-tun," though I do not limit my claim to a mash-tun, as the apparatus may readily be used as a cooker, a hop-jack, or a fermenting and settling vat; and it consists in the devices and combinations of devices hereinafter claimed.

In brewing, as is well known, the ground malt or "grist" from the "hopper" or ground barley, rice, or corn from the "cooker" is led into a vat or tun called the "mash-tun," where it is treated with water to extract the valuable beer-making elements. Thence the "extract" to be converted into beer must be conducted to other devices, and the spent grains must also be withdrawn for such use as they are suitable.

To obviate difficulties of some earlier devices, I construct my tun in such form that for at least the major part of its height it decreases in cross area toward the bottom, as is plainly shown. In practice this is best accomplished by constructing the tun in the form of an inverted hollow cone frustum T, supported in any suitable manner and extending through the floor F of the apartment wherein its main portion is located. It is preferably provided with a double wall or jacketed, as at J, in order that cooling or heating liquids may be conveniently employed to control or change the temperature of the contained mass and especially to preserve an even temperature in the mash during the sparging and saccharification, and inlet and outlet pipes $j$ $j'$, having stop-cocks $v^3$ $v^4$, lead to and from the jacket-space. At the top it is provided with a tight cover C, preferably convex and furnished with an inlet-pipe M for introducing the mash, another, G, for introducing other material, and a door D, which may be opened to inspect the mash or the machinery within the tun.

Within the tun I locate a rake R, preferably constructed of piping, so joined together that liquids may readily pass from the central shaft to the arms and back again. In its best form this rake has a central upright hollow shaft S, mounted in a support $t$ at the lower end extending through the cover at the top and journaled to revolve in suitable bearings. Gears $g$ $g'$, connected to a source of power, furnish means for conveniently operating it. The arms $a$ branch from this central shaft preferably at points alternating from side to side and in an upwardly oblique direction, their outer ends being connected to other pipes $o$, which substantially conform to the outline of the interior face of the tun, except at the top, and approach the wall as closely as free working will permit. At several points (here three on each side) this outline pipe is carried away (by bends or joints $b$) from the face of the tun that it may clear the thermometer-tube T', I prefer to there place. Above the cover a funnel-piece $f$ is secured to the shaft-pipe S, and an aperture $p$ in said shaft below the upper edge of the funnel permits any liquid introduced into the funnel—say by pipe P—to flow down the hollow shaft S and thence into the arms and connecting pipes of the rake, such flow being controlled by a valve $v$ in said shaft-piping.

Within the cover I secure to shaft S a spirally-coiled pipe S', provided with numerous apertures $p'$ to act as a sparger. At the center this sparger S' communicates with a funnel-piece $f''$, preferably surrounding shaft S and having in its wall an aperture which opens into S, and a feed-pipe P', provided with a stop-cock $v'$, extends through the wall or cover of the tun and opens within the circle of the funnel-piece $f'$, thus providing an always-ready means of introducing liquid into the sparger S'.

Spargers have been heretofore constructed in the form of a single long arm, arranged to revolve about or with a central shaft; but such form does not admit of the introduction of the sparging-water simultaneously over substantially the whole surface of the grains in the tun. In my sparger, on the contrary, the apertures for the escape of the sparging-water are disposed over the surface generally and even if it did not rotate with the shaft the sparging-water escaping through them would be distributed evenly and generally over the surface of the mass in the tun. This insures a more rapid, general, and even distribution of the sparging-water than a single arm would effect, and my experiments lead me to believe that the results thereby attained are superior to those produced by other forms of spargers.

At the lower end the shaft S is preferably supported upon a tripod $t$ by means of a footpiece $t'$, shrunk or otherwise firmly secured to the shaft by a tight joint and turning upon a bearing $b'$ upon the tripod, one arm of the tripod itself being extended beyond the wall of the tun or pierced and provided with a pipe, as shown at $t^2$, to provide an outlet for any fluid in the hollow rake, such outlet being controlled by a stop-cock $v^2$.

Below the rake-support, preferably, the tun is extended downward to form a false bottom or separating-tank $T^2$, and also, preferably, three gates are provided to properly control the desired operations. The first gate $G'$ shuts the tun-bottom entirely, holding the mash above it, and until withdrawn prevents its entry into the tank, thereby protecting the sieve or strainer $s$ of the second gate from being injured or clogged during the mashing and saccharification of the grist. The second gate $G^2$ is provided with a movable sieve or strainer $s$, whose mesh may be varied to suit the condition of the malt. If that were "steely" or "glassy," it probably has and certainly should have been crushed or ground fine, and a fine sieve is required, while if it were "mealy" or "fragile" it probably has been crushed or ground coarse, and sieves correspondingly coarse or both coarse and fine are required. The third gate, like the first, closes the tank $T^2$ but at the bottom and retains the worts prior to running them to the kettle and when opened permits the exit of the spent grains at the end of the sparging-period.

One or more pipes $P^3$ extend from the tank $T^2$ below the second and above the third gate to convey the worts to the kettle, and a further pipe $P^3$, which may be used as an air-vent, leads from tank $T^2$ up to a point above the intended level of the mash, as shown. It has a branch $P^4$, leading into the tun T, and stop-cocks $V^2$ $V^3$ for controlling its operation.

My tun possesses many and important advantages. Its shape insures that it may be readily and speedily emptied, simply by the force of gravity, since its converging walls present no horizontal base upon which material may lodge and be sustained against such force. That shape also insures economy in the power needed to move the gate. The great bulk of the mash will be nearer the rake-shaft than in a truly cylindrical or rectangular tun, and the leverage exerted by the mass against the turning of the rake will be less than in said other forms. The sparging will be more perfect. That of course is effected by the introduction of water through pipe $P'$ and funnel $f'$ to the sparger $S'$, whence it escapes through apertures $p'$, being thereby sprinkled over the surface of the mash. Some of it seeps through the comparatively shallow quantities of the mash lying at the outer part of the mass at the top and that part of the wall of the tun vertically below such part of the surface and then follows down at the side of the tun and is not required to travel the entire depth of the grains. It trickles down into the tank $T^2$, and with the other water—such, for instance, as may be introduced through pipes $P^3$ and $P^4$—and the other grains produces a suction or partial vacuum effect, drawing the extract more completely from the grains and resulting in clear and brilliant worts.

Instead of, as heretofore, leaving in the grains from four per cent. to five per cent. of extract, which is practically lost, I find that a normally prepared mash, consisting of malt or malt with raw or prepared cereals sparged with the usual quantity of water, will in my apparatus be completed in less time than with former devices and will leave substantially no soluble extract in the grains.

Again, the shape of the ordinary tun permits the formation of "fissures" or cracks through the mash, down which cracks the sparge-water, finding there less resistance, would flow, leaving the valuable soluble extracts in the grain, but in my device the form of the tun causes the mash in settling to be forced toward the center, thus preventing the formation of such fissures or cracks and avoiding their objectionable consequences. The alternate arrangement of the arms of the rake causes the mash to be more thoroughly stirred than would otherwise be the case, an arm on one side traversing a space between those traversed by the higher and lower arms on the other side.

Being hollow and connected, the shaft, bars, and connecting-pipes form a continuous system through which cooling or heating liquids may be passed when desired. This permits the rake to be used as an attemperator when the apparatus is serving the purposes of a fermenting and settling vat. Then the rake is also used as a "rouser."

The use of pipe $P^3$ serves as an air-inlet to prevent the formation of a vacuum, which would check the flow of worts from the tank $T^2$, and its branch connection $P^4$, leading into the tun, enables me to introduce air or hot or cold water or live steam (as the case may require) directly into the mash without a multiplicity of pipes.

This apparatus may be operated under pressure or vacuum, or the worts may be run off by gravity alone. So, too, the spent grain may be readily discharged through P⁵ upon opening all three of the gates, thus leaving the apparatus ready for another run.

I do not limit my claim to an apparatus embodying all the details of the one described, as it is manifest that many of its advantages might be secured though several of such details were omitted; nor do I limit myself to the exact form and arrangement shown.

Various changes might be made without in any sense departing from the spirit of the invention. For instance, the sieve is not always made movable, though I prefer that form. Moreover, my use of the word "sieve" is to be understood in the broad sense, which would also include a strainer and a grating as well as a sieve, coming within a limited definition of that word.

What I claim as my invention, and desire to secure by Letters Patent, is—

1. In a brewing apparatus, the combination of a tun provided with a discharge-opening, a sieve arranged beyond said opening and adapted to pass liquids flowing from the tun, but to arrest solids and retain them substantially within the tun, and a gate arranged in front of said sieve and between it and the interior of the tun and adapted, when closed, to protect said sieve, all substantially as set forth.

2. In a brewing apparatus, the combination of a tun, a rake within said tun, formed of a series of connected parts, comprising a shaft, arms extending therefrom, and binders connecting them, together with a spiral sparger supported on the shaft of said rake, at substantially right angles to the plane of the arms, and secured to said rake, whereby the sparger strengthens the rake and the movement of the rake moves the sparger, all substantially as set forth.

3. In a brewing apparatus, the combination of a tun provided with an opening for the discharge of liquids and solids, a gate closing and controlling said opening, and a sieve-gate below said first gate and protected by it, and adapted to pass the liquids flowing from the tun, but to arrest the solids proceeding therefrom, all substantially as set forth.

4. In a brewing apparatus, the combination of a tun provided with a second or false-bottom tank, openings into and from said tank for the receipt and discharge of liquids and solids, a gate closing the inlet thereto, a gate closing the solids-outlet therefrom, but located below the liquids-outlet, and a sieve-gate, adapted to pass the liquids flowing from the tun, but to arrest the solids proceeding therefrom, located between the first gate and the liquids-outlet and protected by said first gate, all substantially as set forth.

5. In a brewing apparatus, the combination of a tun in the form of an inverted hollow cone frustum, a hollow rotatable rake within said tun, conforming generally to the form of the tun, and provided with a series of arms adapted to agitate the contents of the tun on different lines, means, substantially as set forth, for introducing liquid into the interior of said rake and withdrawing it therefrom without contact between said liquid and the mash within the tun, inlets for grains and other material, a sparger and means substantially as set forth for introducing sparging-water into and for delivering it from the same into the space to be occupied by the mass of material within the tun, a jacket surrounding said tun and provided with inlets and outlets, an extension below the main body of said tun, an opening into said extension and an outlet therefrom, removable gates controlling the passage of material through said openings, a removable sieve intermediate said gates adapted to be placed across said openings, pipes leading from said extension, between said gates and below said sieve, and a pipe, leading from said extension to a point above the intended level of the material to be treated in the tun.

6. In a brewing apparatus, the combination of a tun provided with a second or false-bottom tank, openings into and from said tank for the receipt and discharge of liquids and solids, a gate closing the inlet thereto and a gate closing the solids-outlet therefrom, located an appreciable space from the first gate, all substantially as set forth.

In testimony whereof I have signed my name to this specification, in the presence of two subscribing witnesses, this 14th day of November, 1905.

CHARLES B. DAVIS.

Witnesses:
L. D. CHURCH,
A. G. N. VERMILYA.